United States Patent
Sano et al.

(10) Patent No.: US 9,631,951 B2
(45) Date of Patent: Apr. 25, 2017

(54) RESOLVER

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Shinya Sano, Toyota (JP); Masakazu Nagaishi, Toyota (JP); Hiroki Tsuboi, Toyota (JP); Taketo Takeuchi, Nishio (JP); Takafumi Ogisu, Anjo (JP)

(73) Assignees: TOYOTA JIDOSHA KABUSHIKI KAISHA, Toyota (JP); AISIN AW CO., LTD., Anjo-shi (JP)

( * ) Notice: Subject to any disclaimer, the term of this patent is extended or adjusted under 35 U.S.C. 154(b) by 0 days.

(21) Appl. No.: 15/026,886

(22) PCT Filed: Sep. 29, 2014

(86) PCT No.: PCT/IB2014/001952
§ 371 (c)(1),
(2) Date: Apr. 1, 2016

(87) PCT Pub. No.: WO2015/049566
PCT Pub. Date: Apr. 9, 2015

(65) Prior Publication Data
US 2016/0282147 A1      Sep. 29, 2016

(30) Foreign Application Priority Data
Oct. 4, 2013 (JP) .................................. 2013-208993

(51) Int. Cl.
*G01D 5/20* (2006.01)
*G01P 3/488* (2006.01)
*H02K 1/06* (2006.01)

(52) U.S. Cl.
CPC ............ *G01D 5/2046* (2013.01); *G01P 3/488* (2013.01); *H02K 1/06* (2013.01)

(58) Field of Classification Search
CPC .. G01D 5/12; G01D 5/14; G01D 5/20; G01D 5/2006; G01D 5/2013; G01D 5/204; G01D 5/2046; G01P 3/42; G01P 3/44; G01P 3/48; G01P 3/488; H02K 1/0622; H02K 1/24;
(Continued)

(56) References Cited

U.S. PATENT DOCUMENTS 7,159,296 B2 *  1/2007  Miya ................... H02K 15/0056
                                           242/432.6
7,183,952 B1 *  2/2007  Akutsu .................... H02K 24/00
                                           341/112
(Continued)

FOREIGN PATENT DOCUMENTS

JP      2003-028670 A      1/2003
JP      2003-207369 A      7/2003

*Primary Examiner* — Huy Q Phan
*Assistant Examiner* — David Frederiksen
(74) *Attorney, Agent, or Firm* — Oliff PLC

(57) ABSTRACT

A resolver includes a stator core (3), winding wires (12) and a resin mold (6). The resin mold (6) contains a ring portion (4), a connector (5) and a stress reduction structure (9). The ring portion (4) covers the stator core (3). The stress reduction structure is arranged at the connecting portion between the ring portion (4) and the connector (5).

2 Claims, 4 Drawing Sheets

(58) Field of Classification Search
CPC ........ H02K 3/521; H02K 3/522; H02K 11/21; H02K 11/225
See application file for complete search history.

(56) References Cited

U.S. PATENT DOCUMENTS

| | | | |
|---|---|---|---|
| 7,830,051 B2 * | 11/2010 | Kataoka | G01D 5/20 310/71 |
| 8,988,067 B2 * | 3/2015 | Aihara | H02K 24/00 324/207.25 |
| 2003/0137295 A1 | 7/2003 | Akutsu et al. | |
| 2008/0122304 A1 | 5/2008 | Makino et al. | |
| 2008/0169713 A1 | 7/2008 | Kataoka et al. | |
| 2008/0258585 A1 | 10/2008 | Kataoka et al. | |
| 2009/0134724 A1 * | 5/2009 | Ishizeki | H02K 3/522 310/71 |

* cited by examiner

RESOLVER

BACKGROUND OF THE INVENTION

1. Field of the Invention

The present invention relates to a resolver for use in measuring a rotational speed of a motor.

2. Description of Related Art

The resolver has a similar structure to that of the motor and includes a rotor and a stator. The stator core is provided with a plurality of magnetic pole teeth like the stator core of the motor, and a plurality of winding wires are wound around the plurality of the magnetic pole teeth in succession like the stator core of the motor while the core is insulated with a resin mold. In a typical resolver, each magnetic pole tooth is wound with three winding wires. One of them is for excitation and the other two wires are for outputting sine waves and cosine waves.

Both end portions of the plurality of the winding wires are gathered at one place on the external circumference of the stator core, where a connector is formed. At the connector, a controller for the resolver is connected to end portions of the winding wires. The controller for the resolver supplies the winding wires for excitation with a voltage (current) of sine waves while measuring a voltage (current) of the winding wires for output so as to calculate the rotational speed of the rotor. In the meantime, both end portions of the winding wires are referred to as lead wire in this specification.

Usually, the connector is also manufactured of resin. Generally, the connector is formed integrally with a resin mold, which covers the magnetic pole teeth. The lead wires are wound on the resin which covers the magnetic pole teeth while they are fixed to the resin of the connector with varnish or the like. Examples of the resolvers having such a structure have been disclosed in Japanese Patent Application Publication No. 2003-028670 (JP 2003-028670 A) and Japanese Patent Application Publication No. 2003-207369 (JP 2003-207369 A).

By the way, resin has a relatively high linear expansion coefficient (thermal expansion coefficient). Thus, there is a fear that the lead wires which cover the magnetic pole teeth or the lead wires fixed to the resin of the connector may be broken due to thermal expansion of the resin. According to the technology of JP 2003-028670 A, in order to prevent the lead wires from being broken, a coil wound around the magnetic pole tooth is molded with first resin while winding wires (jumper wires) stretched between adjacent magnetic pole teeth are molded with second resin. As the second resin, a material having a lower hardness than the first resin is selected. This technology prevents the jumper wires from being broken by applying the material having a lower hardness to the second resin for covering the jumper wire.

SUMMARY OF THE INVENTION

The present invention provides a technology for relaxing tensile stress applied to lead wires to prevent the lead wires from being broken.

A resolver according to an aspect of the present invention has a following structure. A resolver contains a stator core which has a ring shape with a plurality of magnetic pole teeth provided on an internal circumferential face of the stator core, winding wires including lead wires; and a resin mold on which the winding wires are wound around the plurality of the magnetic pole teeth, the resin mold including: tooth portions that respectively cover the magnetic pole teeth; a ring portion that connects the tooth portions each other, the ring portion covering at least one end face of the stator core; a connector which projects outward in a radial direction from the ring portion, the connector having metal terminals, the lead wires being connected to the metal terminals, the lead wires being fixed to the ring portion and the connector, and a stress reduction structure which is arranged at a connecting portion between the ring portion and the connector, the stress reduction structure being configured to reduce tensile stress applied to the lead wires due to thermal expansion in the radial direction of the ring portion.

The technology disclosed by this invention aims at relaxing the tensile stress applied to the lead wires so as to prevent the lead wires from being broken.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
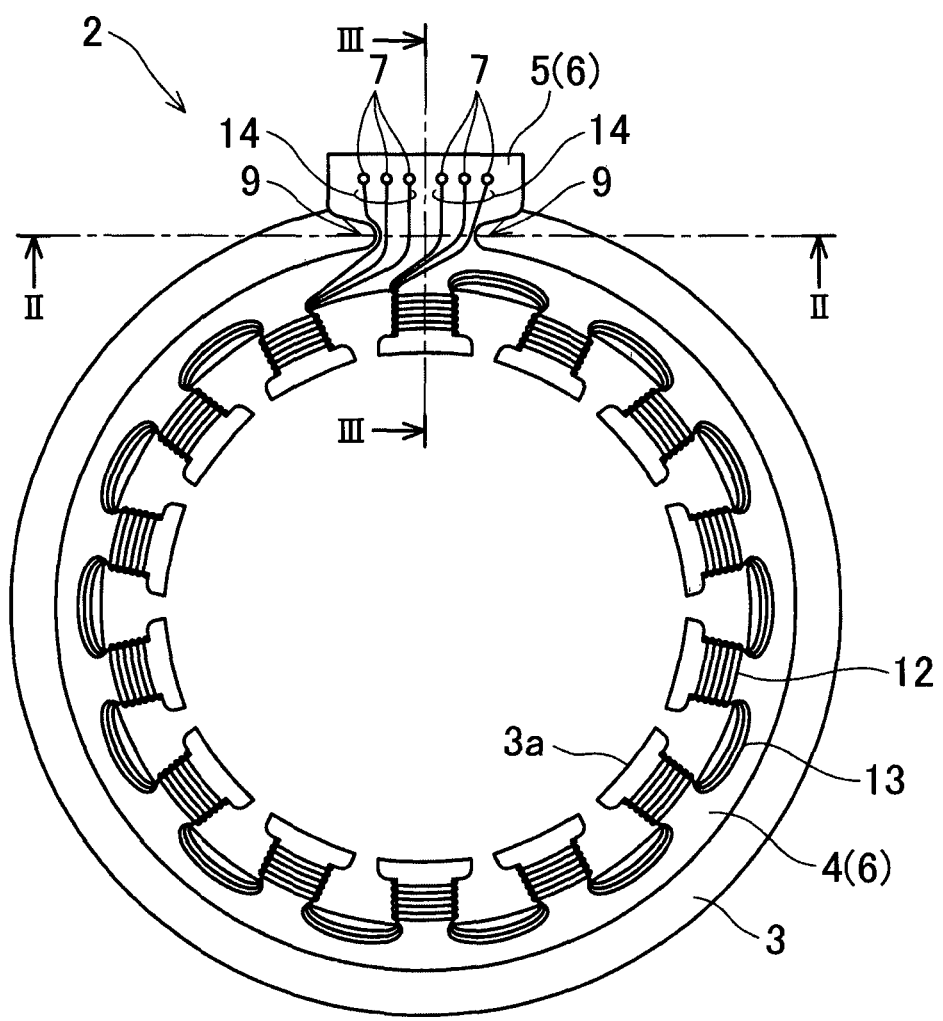
FIG. 1 is a plan view of the stator of a resolver according to a first embodiment.

Magnetic pole teeth are provided on the internal circumferential side of a ring-like stator core and a connector is provided on the external circumferential side. Lead wires are arranged from the internal circumferential side of the stator core to the external circumferential side and at the same time, are fixed to resin. If the resin molded on the ring-like stator core is expanded, the whole resin is prolonged in the radial direction. Consequently, tensile stress is applied to a portion which is arranged from the internal circumferential side of the stator core to the external circumferential side, thereby presenting a fear that the lead wire may be broken. This specification provides a technology for relaxing the tensile stress applied to the lead wire at the portion which is arranged from the internal circumferential side of the stator core to the external circumferential side so as to prevent the lead wire from being broken.

The stator core is a ring-like stator core and has a plurality of magnetic pole teeth on its internal circumferential face. Part of the stator core is covered with a resin mold. The resin mold is formed in a ring-like shape at least on one end face of the stator core so that it covers each of the plurality of the magnetic pole teeth and connects the portions which cover the respective magnetic pole teeth to each other. The ring-like portion of the resin mold is referred to as ring portion in a following description. The winding wires are wound around each of the plurality of the magnetic pole teeth in succession so that they are placed on the resin mold. The resin mold is provided with the connector which projects outward in the radial direction from the ring portion. Metal terminals are mounted on the connector. Then, the lead wires extending from the winding wires wound around the magnetic pole teeth are connected to the metal terminals and fixed to the ring portion and the connector of the resin mold. The lead wires are fixed to the ring portion and the connector with varnish or the like. It comes that the lead wires are arranged from the ring portion to the connector, i.e., from the internal circumferential side of the stator core to the external circumferential side. In the resolver disclosed in this specification, a connecting portion between the ring portion of the resin mold and the connector is provided with a stress reduction structure for reducing the tensile stress applied to the lead wires due to thermal expansion in the ring radial direction of the resin mold. The stress reduction structure relaxes the tensile stress applied to the lead wires due to the thermal expansion of the resin mold.

Specific examples of the stress reduction structure include following two cases. One of them is that the connecting portion is constricted as viewed in the ring axial direction of the stator core. In the meantime, the connecting portion may be constricted curvedly. Another case is reducing the thickness of the connector to be smaller than that of the ring portion of the resin mold.

In any one of the above-described examples, the quantity of resin of the connecting portion between the ring portion and the connector is reduced. Generally, the linear expansion coefficient of the metal which constitutes the stator core is smaller than the linear expansion coefficient of the resin. For example, a linear expansion coefficient α of polycarbonate is approximately 70 $[10^{-6}/°$ C.] and the linear expansion coefficient α of stainless is approximately 10 $[10^{-6}/°$ C.]. Thus, the elongation of the resin mold accompanied by increase in temperature is suppressed by the stator core to which the resin mold is fitted. The more the quantity of resin is reduced, the larger its suppression effect becomes. By reducing the quantity of resin of the connecting portion between the ring portion and the connector, the elongation in the radial direction of the ring portion and the connector is suppressed thereby relaxing the tensile stress applied to the lead wire fixed to the resin mold. Further, changing the thickness of the resin mold leads to arranging the lead wire three-dimensionally in the thickness direction of the resin, not on a plane. That is, the length of the lead wire increases compared to a case where it is arranged on a plane without any change in thickness of the resin mold. Just an increase of the lead wire also contributes to preventing the lead wire from being broken due to tensile stress accompanied by the elongation of the resin mold. In the meantime, the stator core is more preferred if it includes both characteristics that the connecting portion is constricted and that the thickness of the connector is smaller than that of the ring portion of the resin mold.

The technology disclosed by this specification relates to a resolver for measuring the rotational speed, in which the tensile stress applied to the lead wire at a portion in which the lead wire is arranged from the internal circumferential side of the stator core of the resolver to the external circumferential side is relaxed so as to prevent the lead wire from being broken. A detail of the technology disclosed in this specification and its further improvement will be described below.

Figure 2:
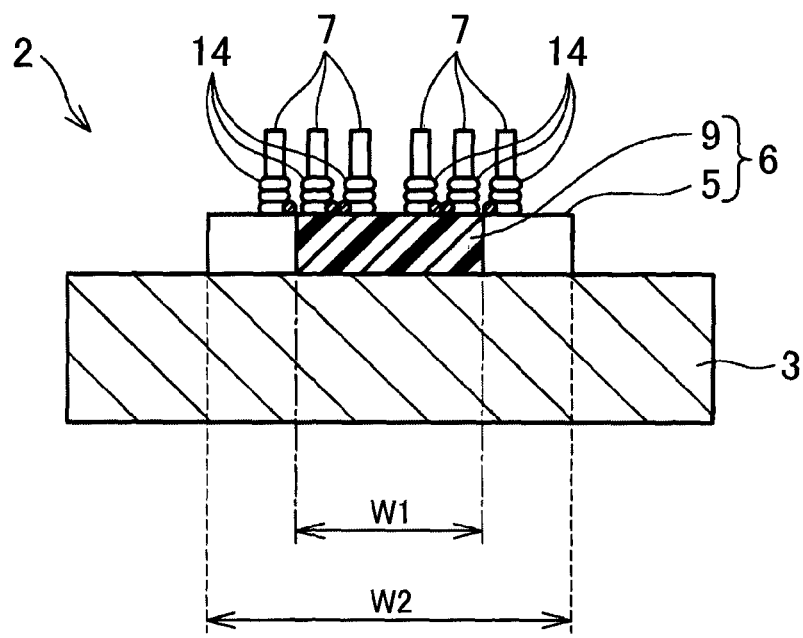
FIG. 2 is a sectional view taken along the line II-II in FIG. 1.
Figure 3:
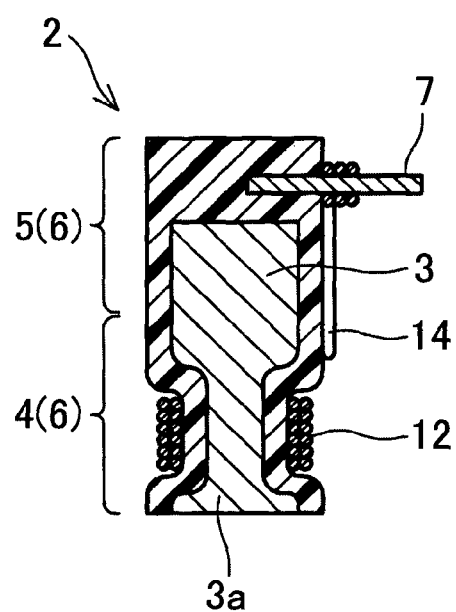
FIG. 3 is a sectional view taken along the line III-III in FIG. 1.

Referring to the drawings, a resolver according to a first embodiment will be described. FIG. 1 shows a plan view of a stator 2 of the resolver. FIG. 2 shows a sectional view taken along the line II-II in FIG. 1 and FIG. 3 shows a sectional view taken along the line III-III in FIG. 1. In this specification, description of a rotor of the resolver is omitted. A stator core 3 is ring-like shaped and a plurality of magnetic pole teeth 3a are provided on the internal circumferential face of the ring. FIG. 1 is a plan view which shows the stator core 3 as viewed from an axial direction thereof. FIG. 2 is a view taken from a direction perpendicular to the axial direction of the stator core 3. The stator core 3 is constructed by stacking a plurality of electromagnetic steel sheets. A resin mold 6 is formed on each of both end faces in the axial direction of the stator core 3. The resin mold 6 is formed on both faces of the stator core 3 in the ring-like shape such that part thereof covers the magnetic pole teeth 3a while the portions which cover each magnetic pole tooth are connected to each other. A ring-like portion of the resin mold 6 is called ring portion 4 below. However, in the magnetic pole teeth 3a, a face directed to the center of the stator core 3 is exposed from the resin mold.

The ring portion 4 is provided with a connector 5 which projects in the radial direction of the stator core 3 at a part thereof. The ring portion 4 and the connector 5 are molded integrally with resin. Six metal terminals 7 are mounted on the connector 5. Approximately a half of the metal terminal 7 in its longitudinal direction is embedded in the connector 5 while the other approximately half thereof is exposed from the connector 5.

Winding wires 12 are wound around each of the plurality of the magnetic pole teeth 3a. Three winding wires 12 are used, each of which is wound around each of the magnetic pole teeth 3a in succession. A winding wire which passes between the adjacent magnetic pole teeth 3a is referred to as jumper wire 13. A wind starting end portion and a wind terminating end portion of the winding wire are referred to as lead wire 14. Because the three winding wires 12 are used, the number of the lead wires 14 is totally 6 including the three wind starting end wires and the three wind terminating end wires.

The lead wires 14 extend from the magnetic pole tooth 3a to the connector 5 and are fixed to the plurality of the metal terminals 7. In the meantime, although FIG. 1 omits representation of winding of the lead wires 14 around each of the metal terminals 7 so as to facilitate understanding of the drawing, it should be noted that FIGS. 2 and 3 illustrate winding of the lead wires 14 around the metal terminal 7. Between the magnetic pole tooth 3a and the metal terminal 7, the lead wire 14 is fixed to the surface of the ring portion 4 and the surface of the connector 5. The lead wire 14 is fixed to the surface of the ring portion 4 and the surface of the connector 5 with varnish or the like. Thus, when the resin mold 6 expands with heat, it comes that tensile stress is applied to the lead wire 14.

As shown in FIG. 1, the lead wire 14 extending from the winding wire 12 wound around the magnetic pole tooth 3a is fixed onto the surface of the resin mold 6. Speaking more in detail, the lead wire 14 extends from the magnetic pole tooth 3a toward the metal terminal 7, in other words, outward from inside in the radial direction of the stator core 3, and is fixed to the resin mold 6. If the temperature of the resin mold 6 increases, the resin mold 6 expands with heat. Particularly, the connector 5 expands outward in the radial direction of the stator core 3. Due to the expansion of the connector 5, tensile stress in the radial direction is generated in the lead wire 14. If the thermal expansion of the connector 5 is large, the lead wire 14 cannot bear the tensile stress thereby producing a fear that it may be broken. For this reason, the resin mold 6 is provided with a constriction 9 at the connecting portion between the connector 5 and the ring portion 4 as viewed in the axial direction of the stator core (i.e., as seen in the plan view of FIG. 1). The quantity of resin at the connecting portion between the connector 5 and the ring portion 4 is reduced by the constriction 9 compared to a case where there is no constriction 9. Generally, the linear expansion coefficient of resin material of the resin mold 6 is larger than that of metallic material of the stator core 3. Thus, the stator core 3 suppresses expansion of the resin mold 6 which is fitted thereto. Because the quantity of resin at the connecting portion between the connector 5 and the ring portion 4 is reduced by the constriction 9 compared to the case where no constriction 9 is provided, expansion force of the resin mold 6 resisting the stator core 3 having a smaller linear thermal expansion coefficient than the resin mold 6 is decreased. That is, the elongation in the radial direction of the stator core of the resin mold 6 is suppressed by the stator core 3. Because the elongation of the resin mold 6 is suppressed, the stress pulling the lead wire 14 decreases. Thus, the fear that the lead wire 14 may be broken can be reduced. In the meantime, as shown in FIG. 2, the width W1 of the connector 5 at the constriction 9 is approximately ½ the width W2 of the connector 5 at other portion than the constriction 9. The sectional area of the connector 5 at the constriction 9 is ½ the sectional area of the connector 5 at other portion than the constriction 9. If the sectional area is ½, the magnitude of the stress due to thermal expansion at the constriction 9 is also ½.

In the stator 2 of the first embodiment, the connecting portion between the ring portion 4 and the connector 5 is constricted curvedly. The curved constriction 9 can obtain an advantage of reducing concentrated stress at the time of thermal expansion through the constriction 9. For example, compared to a constriction having an angular shape, the constriction 9 of the present embodiment can reduce the concentrated stress at the time of thermal expansion more.

Figure 4:
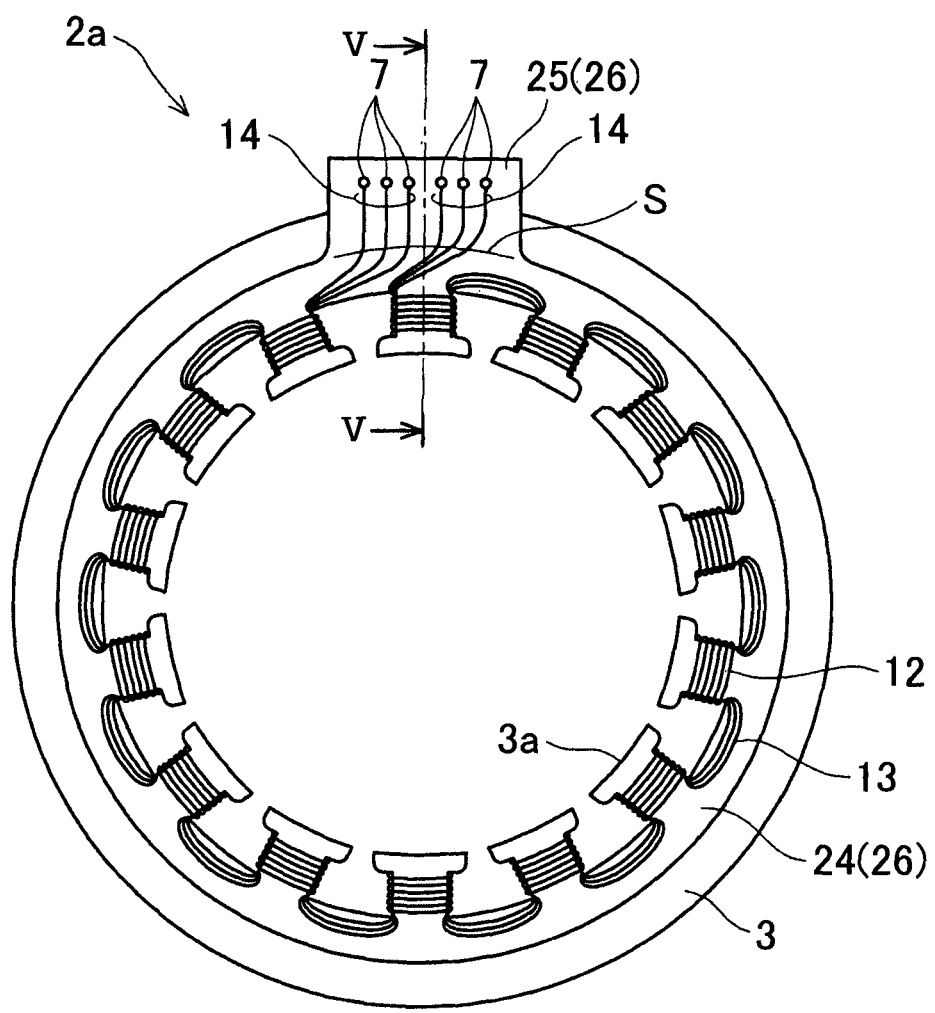
FIG. 4 is a plan view of the stator of a resolver according to a second embodiment.
Figure 5:
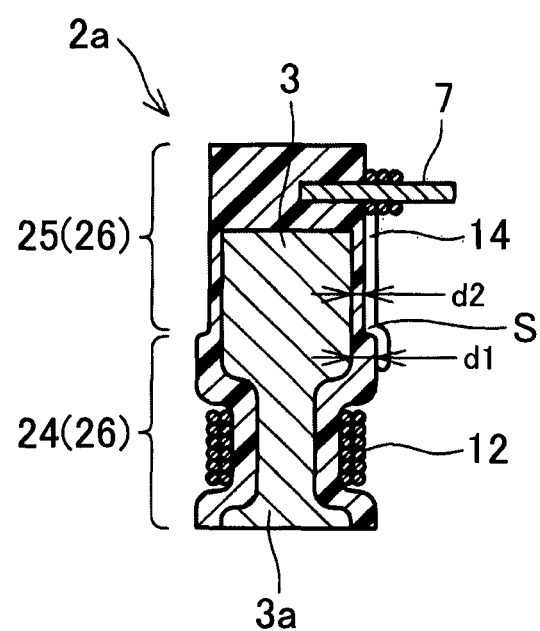
FIG. 5 is a sectional view taken along the line V-V in FIG. 4.

Next, a resolver of a second embodiment will be described with reference to FIGS. 4 and 5. FIG. 4 is a plan view of a stator 2a of the resolver according to the second embodiment and FIG. 5 is a sectional view of the stator 2a taken along the line V-V in FIG. 4. FIG. 4 is a view taken in the axial direction of the stator core 3. FIG. 5 is a view taken in a direction perpendicular to the axial direction of the stator core 3. Although the stator 2a is provided with no constriction of a connector 25, instead, a thickness d2 of a resin mold 26 at the connector 25 is defined to be smaller than a thickness d1 thereof at a ring portion 24. Thus, a difference of step S is produced at a border between surfaces of the resin mold 26 of the ring portion 24 and the connector 25. Because the winding wire must be wound around the magnetic pole tooth 3a repeatedly, the resin mold 26 on the ring portion 24 must obtain an appropriate thickness d1 to maintain a strength of the resin mold 26. However, because the connector 25 is not required to have so much strength as the resin mold on the magnetic pole tooth 3a, there is not serious influence even if the thickness d2 is made smaller than d1. By reducing the thickness d2 of the resin mold 6 on the connector 25, the quantity of resin of the connector 25 can be decreased so as to obtain the same effect as the resolver of the first embodiment. That is, by reducing the thickness of the connector 25, the elongation in the radial direction of the stator core of the resin mold 26 is suppressed by the stator core 3. As a result, the stress pulling the lead wire 14 due to the thermal expansion of the resin mold 26 decreases.

Further, as evident from comparison of FIG. 3 with FIG. 5, in the stator core 2a of the second embodiment, the lead wire 14 is elongated just by an amount of the wire arranged on the difference of step S in thickness of the resin mold 26. Elongating the lead wire 14 simply intensifies resistance to the tensile stress due to the thermal expansion of the resin mold 26.

What should be noted about the resolver explained in the embodiments will be described. The resolver may include both features of providing the resolver with the constriction 9 at the connecting portion between the ring portion 4 and the connector 5 which is the feature of the stator 2 of the first embodiment and reducing the thickness of the connector 25 which is the feature of the stator 2a of the second embodiment.

The constriction 9 and the connector 25 having the reduced thickness lead to reduction of the amount of resin compared to conventionally. Resultant reduction of the tensile stress to the lead wire 14 due to thermal expansion itself also contributes to avoiding breakage of the lead wire 14.

The constriction 9 corresponds to an example of the stress reduction structure and the reduced resin thickness of the connector 25 corresponds to another example of the stress reduction structure.

The resin mold is formed on both sides of each of the stator cores 2 and 2a of the embodiments. The resin mold may be formed only on a side on which the lead wires are arranged. Further, instead of being fixed to the surface of the resin mold, the lead wires 14 may be embedded in the resin mold.

Although the specific examples of the present invention have been described in detail above, they are just exemplifications but never restrict the range of claims of the present invention. The technologies described in the range of claims of the invention include modifications and alterations of the specific examples exemplified above. The technical components described in this specification and drawings exert its technical usability independently or by various kinds of combinations but are not restricted by combinations thereof described in claims upon filing. Further, although the technology exemplified in this specification and the drawings can achieve plural purposes at the same time, achieving one of the purposes itself means having the technical usability.

What is claimed is:
1. A resolver comprising:
a stator core having a ring shape, a plurality of magnetic pole teeth provided on an internal circumferential face of the stator core,
winding wires including lead wires; and
a resin mold on which the winding wires are wound around the plurality of the magnetic pole teeth, the resin mold including:
tooth portions that respectively cover the magnetic pole teeth,
a ring portion that connects the tooth portions each other, the ring portion covering at least one end face of the stator core;
a connector projecting outward in a radial direction from the ring portion, the connector including metal terminals, and the lead wires being connected to the metal terminals, the lead wires being fixed to the ring portion and the connector, and
a stress reduction structure arranged at a connecting portion between the ring portion and the connector, the stress reduction structure being configured to reduce tensile stress applied to the lead wires due to thermal expansion in the radial direction of the ring portion
wherein the stress reduction structure is provided with a constriction, and
in the constriction, the connecting portion as viewed in an axial direction of the stator core is constricted.

2. The resolver according to claim 1, wherein the constriction is so constructed that the connecting portion is constricted curvedly.

* * * * *